(12) United States Patent
Guo

(10) Patent No.: US 8,316,426 B2
(45) Date of Patent: Nov. 20, 2012

(54) APPARATUS, COMPUTER PROGRAM PRODUCT AND METHOD FOR SECURE AUTHENTICATION RESPONSE IN A MOBILE TERMINAL

(75) Inventor: Yile Guo, Coppell, TX (US)

(73) Assignee: Nokia Corporation, Espoo (FI)

( * ) Notice: Subject to any disclaimer, the term of this patent is extended or adjusted under 35 U.S.C. 154(b) by 1144 days.

(21) Appl. No.: 11/551,449

(22) Filed: Oct. 20, 2006

(65) Prior Publication Data

US 2007/0107049 A1 May 10, 2007

Related U.S. Application Data

(60) Provisional application No. 60/729,031, filed on Oct. 21, 2005.

(51) Int. Cl.
*G06F 7/04* (2006.01)
*G06F 17/30* (2006.01)
*H04L 29/06* (2006.01)

(52) U.S. Cl. .................. 726/9; 726/4; 726/7; 380/270; 380/273; 713/183; 713/184

(58) Field of Classification Search ................ 726/7, 4, 726/9; 380/270, 273; 713/183, 184
See application file for complete search history.

(56) References Cited

U.S. PATENT DOCUMENTS

| | | | |
|---|---|---|---|
| 6,230,002 B1 * | 5/2001 | Floden et al. ................. | 455/411 |
| 2001/0005675 A1 | 6/2001 | Aho | |
| 2003/0159031 A1 | 8/2003 | Muller et al. | |
| 2005/0102517 A1 * | 5/2005 | Paddon et al. ................. | 713/168 |
| 2006/0079205 A1 * | 4/2006 | Semple et al. ................. | 455/411 |
| 2006/0196931 A1 * | 9/2006 | Holtmanns et al. ........... | 235/380 |
| 2006/0236116 A1 * | 10/2006 | Patel ............................ | 713/183 |
| 2006/0271785 A1 * | 11/2006 | Holtmanns et al. ........... | 713/171 |
| 2006/0288407 A1 * | 12/2006 | Naslund et al. .................... | 726/9 |
| 2007/0005730 A1 * | 1/2007 | Torvinen et al. .............. | 709/219 |
| 2008/0215888 A1 * | 9/2008 | Barriga et al. ................ | 713/176 |

FOREIGN PATENT DOCUMENTS

| | | |
|---|---|---|
| EP | 1 001 641 | 5/2000 |
| EP | 1 513 113 | 3/2005 |

OTHER PUBLICATIONS

"Hypertext Transfer Protocol (HTTP) Digest Authentication Using Authentication and Key Agreement (AKA)" Niemi et al. RFC 3310, Sep. 2002.*

3GPP TS 33.220 "Generic Authentication Architecture (GAA); Generic bootstrapping architecture (Release 6)" 3GPP, Dec. 2004.*

(Continued)

*Primary Examiner* — Michael Simitoski
(74) *Attorney, Agent, or Firm* — Alston & Bird LLP

(57) ABSTRACT

A mobile terminal for securely communicating with a network includes a user identity module (UIM). The UIM is in operable communication with a user equipment module and includes a password provisioning module (PPM), a password generating module and a response generation module (RGM). The user equipment module includes a client application. The PPM is configured to store a password. The password generating module is in operable communication with the PPM and configured to generate the password. The RGM is in operable communication with both the client application and the PPM. The RGM is configured to generate an authentication response from the password in response to a request from the client application.

24 Claims, 4 Drawing Sheets

OTHER PUBLICATIONS

Franks, J. et al. "HTTP Authentication: Basic and Digest Access Authentication" (RFC 2617), Jun. 1999.*

Niemi, A. et al. "Hypertext Transfer Protocol (HTTP) Digest Authentication Using Authentication and Key Agreement (AKA)" (RFC 3310), Sep. 2002.*

Boman, K. et al. "UMTS security", Oct. 2002.*

The International Search Report for PCT Application No. PCT/IB2006/002956; Filed Oct. 20, 2006; Date of Completion Feb. 5, 2007; Date of Mailing Feb. 6, 2007.

The Written Opinion for PCT Application No. PCT/I132006/002956; Filed Oct. 20, 2006; Date of Completion Feb. 5, 2007; Date of Mailing Feb. 6, 2007.

Non-Final Rejection for Korean Application No. 10-2008-7012015 dated Mar. 30, 2010.

Non-Final Rejection for Korean Application No. 10-2008-7012015 dated Sep. 30, 2010.

* cited by examiner

APPARATUS, COMPUTER PROGRAM PRODUCT AND METHOD FOR SECURE AUTHENTICATION RESPONSE IN A MOBILE TERMINAL

CROSS REFERENCE TO RELATED APPLICATION

This application claims the benefit of U.S. Provisional Application No. 60/729,031, filed Oct. 21, 2005, the contents of which are incorporated herein in their entirety.

TECHNOLOGICAL FIELD

Embodiments of the present invention relate generally to wireless technology and, more particularly, relate to the secure generation of a hyper text transfer protocol (HTTP) digest response in a mobile terminal.

BACKGROUND

Security of mobile terminals, such as portable communication devices (PCDs) (e.g., cellular telephones), portable digital assistants (PDAs), laptop computers, or any suitable device that is capable of communicating with a wireless network, is increasingly important to mobile terminal users. Security algorithms are often employed to achieve security between a mobile terminal and another network entity. These security algorithms often rely upon a secret that is shared between the mobile terminal and the other network entity that permits the mobile terminal to be authenticated. Typically, this shared secret is embodied in the form of a key. In order to further enhance the security, many security algorithms require re-keying at various intervals. Re-keying is a process in which new keys are established such that future communications may be protected with the new keys. If a third party obtained one set of keys and therefore compromised the security between the mobile terminal and the other network entity, re-keying would prevent the third party from continuing to be able to access the communication with the mobile terminal once a new set of keys has been established, thereby limiting temporally the security breach.

An example of client authentication for which secure communication is highly desirable is HTTP digest access authentication. HTTP digest access authentication verifies that both a client and a server know a shared secret (HTTP password). In HTTP digest access authentication, it is desirable that the verification be performed without sending the password in the clear, i.e., in an unprotected manner. Following performance of the verification, secure communications are commenced between the client and the server.

The HTTP digest access authentication scheme is based on a simple challenge-response paradigm. The scheme involves a challenge being issued to the client using a nonce value. A valid HTTP response to the challenge verifies knowledge of the shared secret. An HTTP response is generated as an output from a security algorithm or security function. The output contains a checksum of the username, the HTTP password, the nonce value, the HTTP method and the requested universal resource indicator (URI). Accordingly, if the HTTP password can be obtained by another entity, security is lost with respect to subsequent communications.

A mobile terminal typically includes at least a user identity module (UIM) and mobile equipment (ME). The UIM is a low power processor that contains secure memory and provides secure processing. The UIM may be, for example, a universal integrated circuit card (UICC), a subscriber identity module (SIM), a removable user identity module (R-UIM), etc. Thus, the UIM may be a removable device or embedded in the mobile terminal. The ME contains a high power processor and is not assumed to contain secure memory or provide secure processing.

For mobile applications, an HTTP client runs at the ME, due to the high processing power of the ME. The HTTP response is either generated in the ME or delivered from the UIM to the ME. Then the HTTP response is sent from the ME to a network entity in order to perform verification of knowledge of the shared secret. The current means for accomplishing the delivery of the HTTP response to the ME requires that the HTTP password either be sent to or stored at the ME. The HTTP password may then be used to generate the HTTP response. However, since the ME may not contain secure storage and/or provide secure processing capability, the HTTP password is at risk of being compromised, thereby preventing secure communication between the HTTP client and the server.

BRIEF SUMMARY

A method and apparatus are therefore provided for generating the HTTP response within the secure processor of the UIM and delivering the HTTP response to the ME. Thus, the HTTP password is never exposed to an unsecured environment.

In one exemplary embodiment, an apparatus such as, for example, a mobile terminal for securely communicating with a network is provided. The apparatus includes a user identity module (UIM). The UIM is in operable communication with a user equipment module and may include a password provisioning module (PPM), a password generating module and a response generation module (RGM). The user equipment module includes a client application. The PPM is configured to store a password. The password generating module is in operable communication with the PPM and configured to generate the password. The RGM is in operable communication with both the client application and the PPM. The RGM is configured to generate an authentication response from the HTTP password in response to a request from the client application.

In another exemplary embodiment, a method for establishing secure receipt of a response in a mobile terminal is provided. The method may include operations of storing a password in a password provisioning module (PPM) of a user identity module (UIM), receiving a request for an authentication response from a response generation module (RGM) in operable communication with the PPM and a client application sending the request, sending the password from the PPM to the RGM in response to the request, and generating the response at the RGM responsive to the request and the password. In an exemplary embodiment, the method may further include sending the response from the RGM to the client application.

In another exemplary embodiment, a computer program product for establishing secure receipt of a response in a mobile terminal is provided. The computer program product includes at least one computer-readable storage medium having computer-readable program code portions stored therein. The computer-readable program code portions include first, second and third executable portions. The first executable portion is for receiving a request for an authentication response from a response generation module (RGM) in operable communication with a password provisioning module (PPM) and a client application sending the request. The second executable portion is for sending a password from the PPM to the RGM in response to the request. The third executable portion is for generating the response at the RGM responsive to the request and the password.

In another exemplary embodiment, an apparatus for establishing secure receipt of a response in a mobile terminal is provided. The apparatus includes means for receiving a request for an authentication response from a response generation module (RGM) in operable communication with a password provisioning module (PPM) and a client application sending the request, means for sending a password from the PPM to the RGM in response to the request, and means for generating the response at the RGM responsive to the request and the password.

Embodiments of the invention provide a method and apparatus for generating an HTTP response in the secured UIM of a mobile terminal. As a result, security of communications between client applications on the mobile terminal and a network server may be improved.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
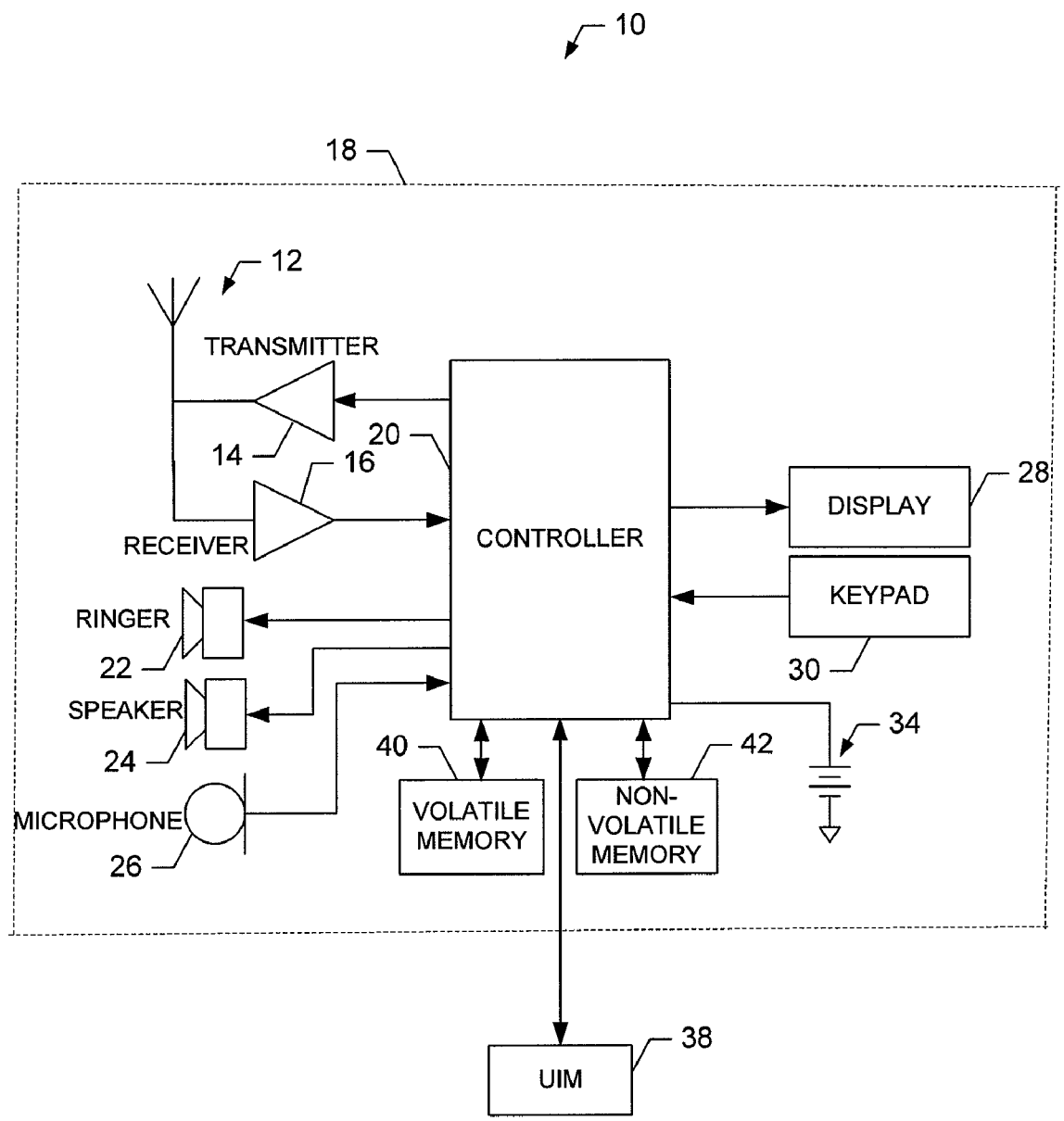
FIG. 1 is a schematic block diagram of a mobile terminal according to an exemplary embodiment of the present invention.

Embodiments of the present inventions now will be described more fully hereinafter with reference to the accompanying drawings, in which some, but not all embodiments of the inventions are shown. Indeed, embodiments of these inventions may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, laptop computers and other types of voice and text communications systems, can readily employ embodiments of the present invention. Moreover, the method of embodiments of the present invention will be primarily described in conjunction with mobile communications applications. But the method of embodiments of the present invention can be utilized in conjunction with a variety of other applications, both in the mobile communications industries and outside of the mobile communications industries. In addition, while several embodiments of the method of the present invention are performed or used by a mobile terminal 10, the method may be employed by other than a mobile terminal.

The mobile terminal 10 includes an antenna 12 in operable communication with a transmitter 14 and a receiver 16. The mobile terminal 10 further includes a controller 20 that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. More particularly, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA).

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example. Also, for example, the controller 20 may be capable of operating a software application capable of creating an authorization for delivery of location information regarding the mobile terminal, in accordance with embodiments of the present invention (described below).

The mobile terminal 10 also comprises a user interface including a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 includes the conventional numeric (0-9) and related keys (#, *), and other keys used for operating the mobile terminal 10. The mobile terminal 10 further includes a battery 34, such as a vibrating battery pack, for powering various circuits that are required to operate the mobile terminal 10, as well as optionally providing mechanical vibration as a detectable output.

All of the above described elements of the mobile terminal 10 collectively comprise mobile equipment (ME) 18, e.g., a user equipment module. In addition to the ME 18, the mobile terminal 10 may include a universal identity module (UIM)

38. The UIM 38 is typically a memory device having a processor built in. The UIN 38 may include, for example, a subscriber identity module (SIN), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal to implement the functions of the mobile terminal. For example, the memories can include an identifier, such as an international mobile equipment identification (IMEI) code, capable of uniquely identifying the mobile terminal 10.

Figure 2:
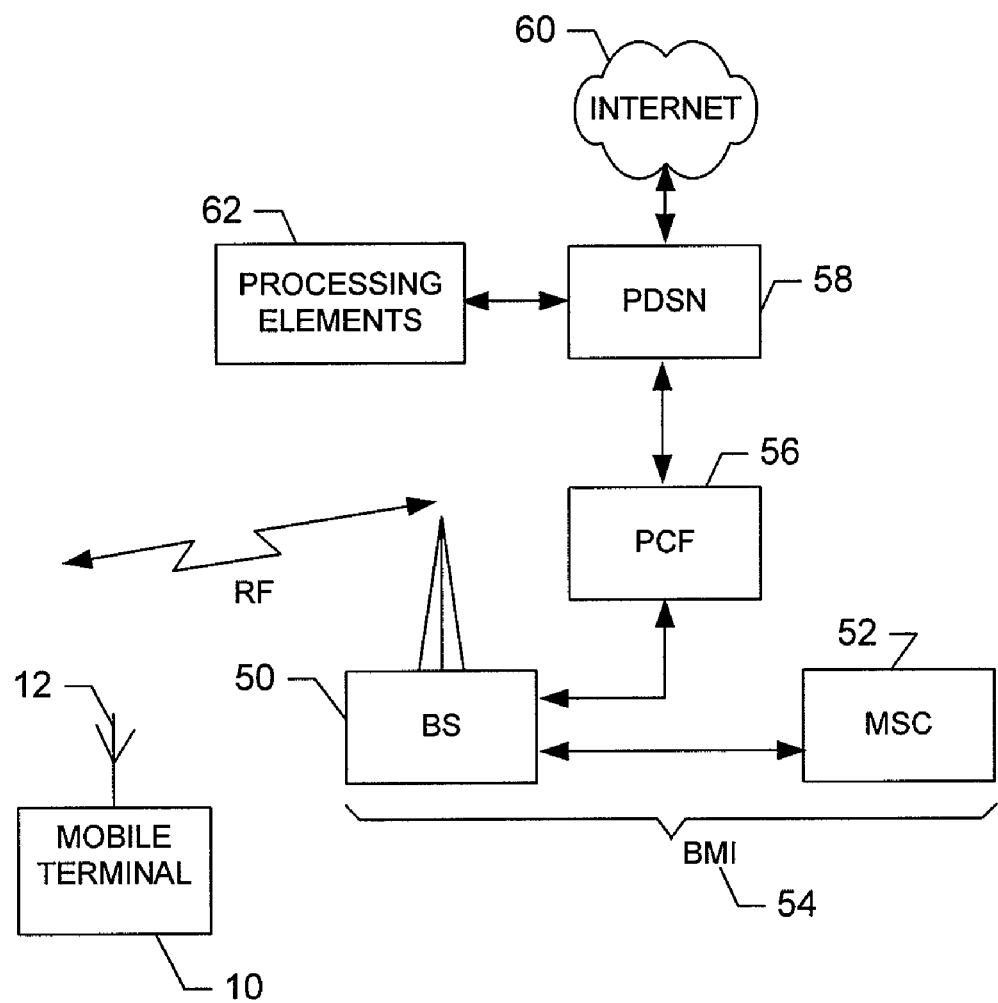
FIG. 2 is a schematic block diagram of a wireless communications system according to an exemplary embodiment of the present invention.

Referring now to FIG. 2, an illustration of one type of wireless communications network including a terminal, such as the mobile terminal 10, which would benefit from embodiments of the present invention is provided. As shown, the mobile terminal 10 includes the antenna 12 for transmitting signals to and for receiving signals from a base site or base station (BS) 50. The BS 50 is a part of a cellular network that includes a mobile switching center (MSC) 52, voice coder/decoders (vocoders), data modems, and other units required to operate the cellular network. The MSC 52 is capable of routing calls and messages to and from the mobile terminal 10 when the mobile terminal 10 is making and receiving calls. The cellular network may also be referred to as a Base Station/MSC/Interworking function (BMI) 54. The MSC 52 controls the forwarding of messages to and from the mobile terminal 10 when the mobile terminal 10 is registered with the cellular network, and also controls the forwarding of messages for the mobile terminal 10 to and from a message center (not shown). Such messages may include, for example, voice messages received by the MSC 52 from users of Public Switched Telephone Network (PSTN) telephones, and may also include Short Message Service (SMS) messages and voice messages received by the MSC 52 from the mobile terminal 10 or other mobile terminals serviced by the cellular network.

The mobile terminal 10 can also be coupled to a data network. For example, the BS 50 can be connected to a packet control function (PCF) 56, which is in connection with a Packet Data Serving Node (PDSN) 58. The PDSN 58 may be connected to a wide area network, such as the Internet 60. In turn, devices such as processing elements 62 (e.g., personal computers, server computers or the like) can be coupled to the mobile terminal 10 via the PDSN 58. By directly or indirectly connecting both the mobile terminal 10 and the other devices to the PDSN 58 and the Internet 60, the mobile terminal 10 can communicate with the other devices, such as according to the Internet Protocol (IP) specification, to thereby carry out various functions of the mobile terminal 10.

Although not every element of every possible network is shown and described herein, it should be appreciated that the mobile terminal 10 may be coupled to one or more of any of a number of different networks using one or more of any of a number of different modes (also referred to herein as protocols). In this regard, the network can be capable of supporting communication in accordance with any one or more of a number of first-generation (1G), second-generation (2G), 2.5G and/or third-generation (3G) mobile communication protocols or the like. More particularly, the mobile terminal may be coupled to a network capable of supporting communication in accordance with 2G wireless communication protocols IS-136 (TDMA), GSM, and IS-95 (CDMA). Also, for example, the network can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as CDMA2000 and Universal Mobile Telephone System (UMTS) network employing Wideband Code Division Multiple Access (WCDMA) radio access technology. Additionally, the network may be capable of supporting wide area network (WAN) communications, such as WLAN (IEEE 802.11) or WiMAX (802.16). Some narrow-band AMPS (NAMPS), as well as TACS, network(s) may also benefit from embodiments of the invention, as should dual or higher mode mobile stations (e.g., digital/analog or TDMA/CDMA/analog phones).

Figure 3:
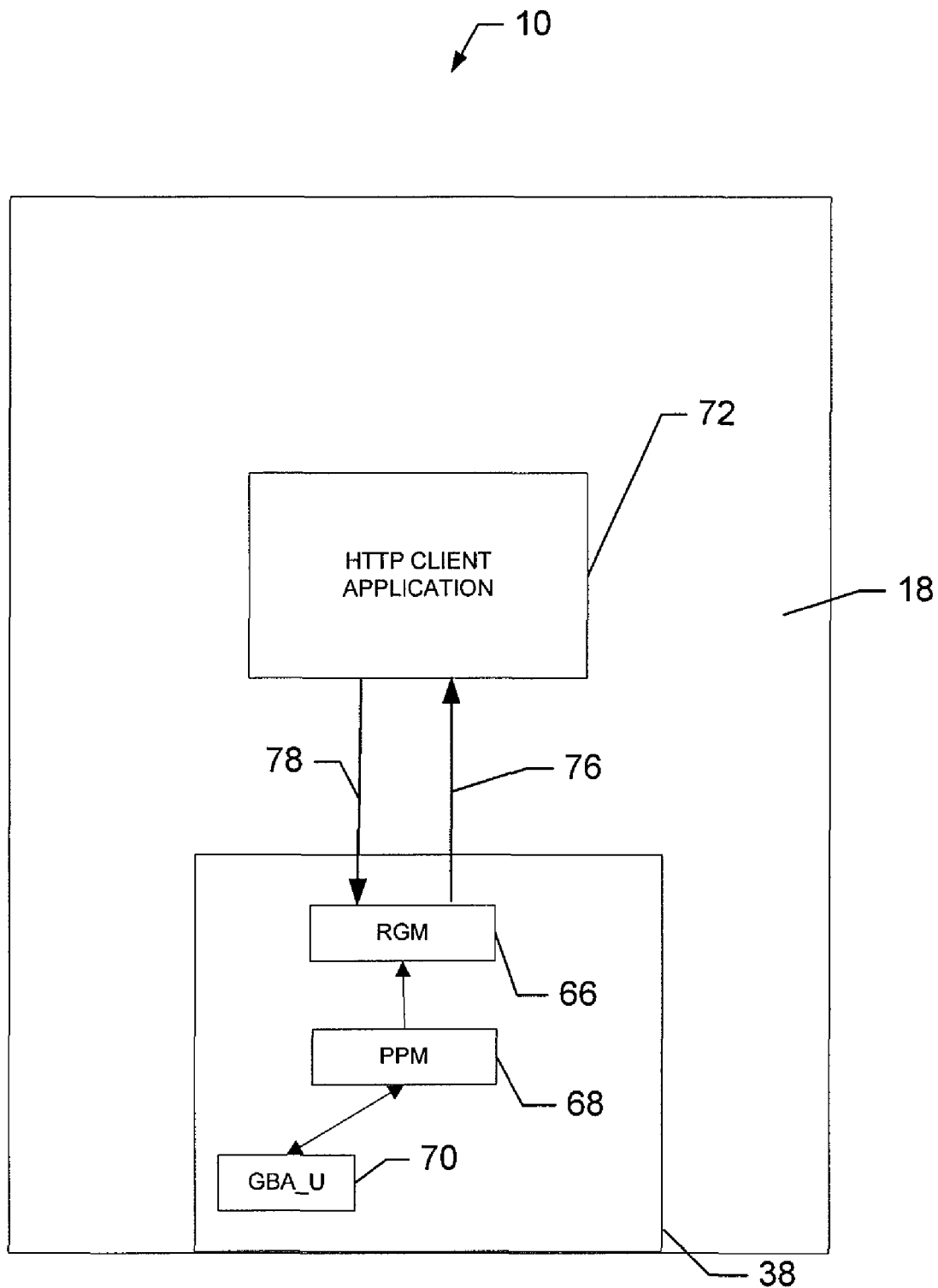
FIG. 3 illustrates a schematic block diagram of a mobile equipment (ME) and a user identity module (UIM) of the mobile terminal according to an exemplary embodiment of the present invention.

Reference is now made to FIG. 3, which illustrates a schematic block diagram of the ME 18 and UIM 38 of the mobile terminal 10 according to an exemplary embodiment of the present invention. It should be understood, however, that the mobile terminal 10 illustrated and hereinafter described is merely illustrative of one type of mobile terminal that would benefit from embodiments of the invention and, therefore, should not be taken to limit the scope of embodiments of the invention.

As shown in FIG. 3, the UIM 38 includes a response generation module (RGM) 66, a password provisioning module (PPM) 68, and an HTTP password generating module which may employ, for example, a Generic Bootstrap Architecture (GBA). GBA is a framework architecture that allows bootstrapping (or changing) of a security key between the mobile terminal 10 and a home network, which can then be used to further derive security keys for use between the mobile terminal 10 and a network application server. GBA may be used as a mechanism to provide keys for securing internet protocol (IP) level handovers. For example, Third Generation Partnership Project 2 Wireless Local Area Networks (3GPP2-WLAN) and Third Generation Partnership Project Wireless Local Area Networks (3GPP-WLAN) working groups are developing mechanisms for mobile terminals to be authenticated securely when handing over from one network to another. Thus, for example, the HTTP password generating module may be a GBA unit (GBA_U) 70. The GBA_U 70 generates the HTTP password and sends the HTTP password to the PPM 68. The PPM 68 stores the HTTP password for all HTTP applications.

In operation, when an HTTP client application 72 requires an HTTP response to establish secure communications with the processing element 62, the HTTP client application 72 sends a request 78 to the RGM 66. The request 78 includes information including an application identity, a username, and a nonce, all of which are received from the processing element 62. The RGM 66 then requests the HTTP password from the PPM 68. The PPM 68 sends the HTTP password to the RGM 66, which then generates the HTTP response 76 from the username, the nonce, the HTTP password, etc. according to a security algorithm or security function. In an exemplary embodiment, the security algorithm may be that specified in IETF RFC 2617. The RGM 66 then sends the HTTP response 76 to the HTTP client application 72 to permit establishment of secure communications with the processing element 62. An interface between the HTTP client application 72 and the RGM 66 may be, for example, via a 3GPP2 or a 3GPP protocol.

In an exemplary embodiment, the UIM 38 may calculate a valid HTTP response, a portion of which may include an authorization header. The valid HTTP response contains a checksum of the username, the HTTP password, the nonce value, the HTTP method and the requested URI. The username is set to a bootstrapping transaction ID (B-TID) which is passed by the ME 18 to the UIM 38. The HTTP password is set to be a Ks_int_NAF (base64 encoded). The Ks_int_NAF is generated using the GBA_U 70 inside the UIM 38. The nonce value, the HTTP method and the requested URI are passed to the UIM 38 by the ME 18. Upon receipt of the username, the HTTP password, the nonce value, the HTTP method and the requested URI, the UIM 38 (specifically the RGM 66 of the UIM 38) generates the valid HTTP response and sends the valid HTTP response to the ME 18.

Figure 4:
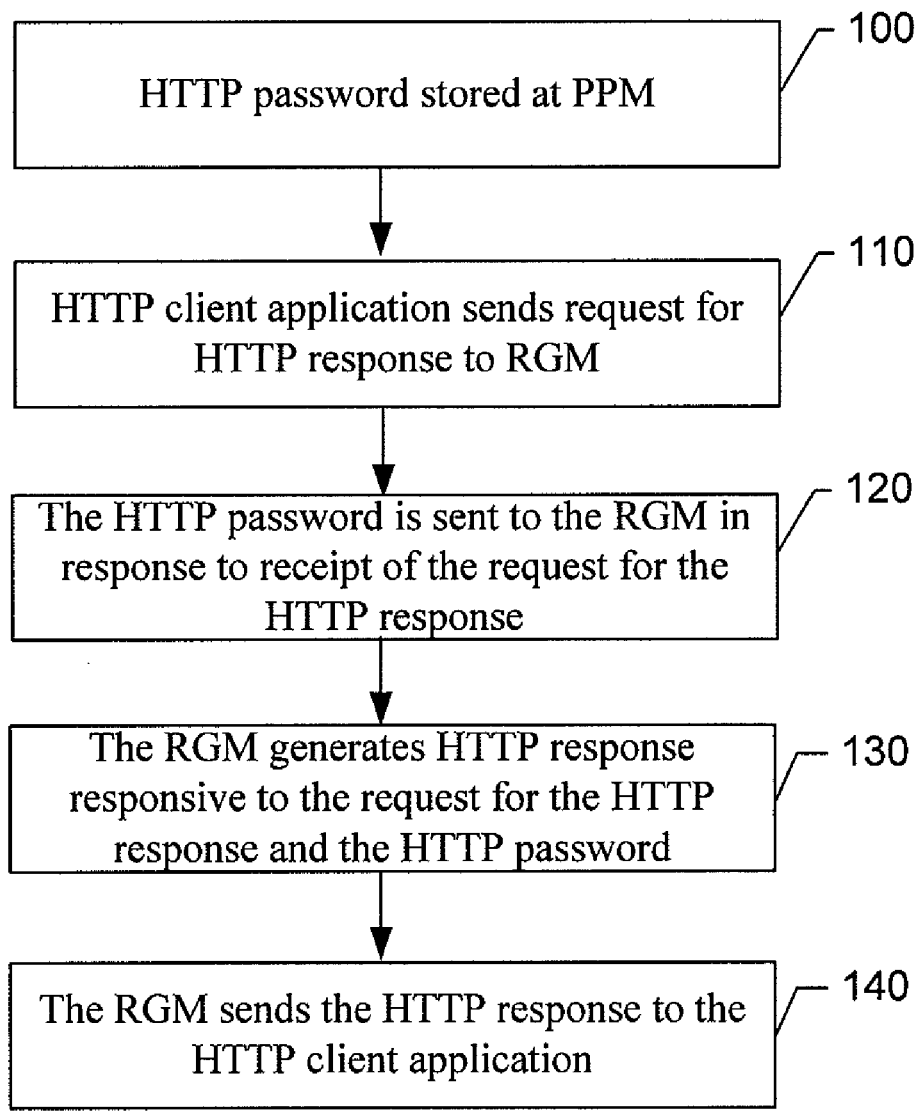
FIG. 4 illustrates a block diagram according to an exemplary method of generating an HTTP response in a secured UIM of a mobile terminal.

FIG. 4 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the GBA_U 70, the PPM 68, the RGM 66 and the HTTP client application 72 may be embodied by computer program instructions. In this regard, the computer program instructions which embody the GBA_U 70, the PPM 68, and the RGM 66 may be stored by the memory device of the UIM 38 and executed by the built-in processor. The HTTP client application 72 is typically stored in memory of the ME 18 and executed by the controller 20. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for secure HTTP digest response in a mobile terminal includes storing an HTTP password at a PPM of a UIM at operation 100. An HTTP client application sends a request for an HTTP response to a RGM of a UIM at operation 110. This request by the HTTP client application may be in response to an inquiry by a server or other network entity to verify that the client, i.e., the mobile terminal 10 knows the shared secret such that secure communication can be conducted. At operation 120, the HTTP password is sent to the RGM in response to receipt of the request for the HTTP response. At operation 130, the RGM generates an HTTP response responsive to the request for an HTTP response and the HTTP password. At operation 140, the RGM sends the HTTP response to the HTTP client application. Following its receipt, the HTTP client application can provide the server or other network entity with the HTTP response so that the server or other network entity can determine that the mobile terminal 10 is in possession of the shared secret so that future communications may be secure. Thus, the HTTP password never leaves the secured UIM, but the HTTP client application still obtains the HTTP response that is needed to verify to the server or other network entity that the mobile terminal 10 know the shared secret. Therefore, security of communications between the HTTP client application and a server at a network is less likely to be compromised.

It should be noted that the method and system described above are also applicable to establishing secure authentication of devices other than via HTTP digest access authentication. However, HTTP digest access authentication is described above, in detail, to provide a complete description of one exemplary embodiment of such a method and system.

Many modifications and other embodiments of the inventions set forth herein will come to mind to one skilled in the art to which these inventions pertain having the benefit of the teachings presented in the foregoing descriptions and the associated drawings. Therefore, it is to be understood that embodiments of the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving a request for an authentication response from a response generation module (RGM) in communication with a password provisioning module (PPM) and a client application sending the request, the PPM, the RGM, and a generic bootstrapping architecture (GBA) unit being disposed at a user identity module (UIM), and the client application being outside of the UIM on a user terminal in communication with the UIM;
   causing a password to be sent from the PPM to the RGM in response to the request, wherein the password is generated by the GBA unit and stored in the PPM;
   generating the authentication response at the RGM, via a processor of the UIM, from the password and a bootstrapping transaction ID in response to the request and the password; and
   causing the authentication response to be sent from the RGM, off of the UIM, to the client application.

2. The method of claim 1, wherein sending the password comprises causing the password, generated by the GBA unit, to be stored in the PPM and then to be sent from the PPM to the RGM such that the password never leaves the UIM.

3. The method of claim 1, wherein generating the authentication response comprises generating a hyper text transfer protocol (HTTP) response including a checksum of a username, the password, a nonce value, an HTTP method and a requested universal resource identifier (URI).

4. The method of claim 1, wherein the request comprises an application identity, a username, and a nonce.

5. The method of claim 1, further comprising generating the password in the GBA unit.

6. The method of claim 1 further comprising storing the password in the PPM.

7. The method of claim 6, wherein storing the password comprises storing a hyper text transfer protocol (HTTP) password.

8. The method of claim 7, wherein receiving the request for the authentication response comprises receiving a request for a hyper text transfer protocol (HTTP) response.

9. A computer program product comprising at least one computer-readable non-transitory storage medium having computer-readable program code portions stored therein, the computer-readable program code portions comprising:
   a first executable portion for receiving a request for an authentication response from a response generation module (RGM) in communication with a password provisioning module (PPM) and a client application sending the request, the PPM, the RGM, and a generic bootstrapping architecture (GBA) unit being disposed at a user identity module (UIM), and the client application being outside of the UIM on a user terminal in communication with the UIM;
   a second executable portion for sending a password from the PPM to the RGM in response to the request wherein the password is generated by the GBA unit and stored in the PPM;
   a third executable portion for generating the authentication response at the RGM from the password and a bootstrapping transaction ID in response to the request and the password; and
   a fourth executable portion for causing the authentication response to be sent from the RGM, off of the UIM, to the client application.

10. The computer program product of claim 9, wherein the second executable portion includes instructions for causing the password, generated by the GBA unit, to be stored in the PPM and then to be sent from the PPM to the RGM such that the password never leaves the UIM.

11. The computer program product of claim 9, wherein the third executable portion includes instructions for generating a hyper text transfer protocol (HTTP) response including a checksum of a username, the password, a nonce value, an HTTP method and a requested universal resource identifier (URI).

12. The computer program product of claim 9, wherein the first executable portion includes instructions for receiving the request which includes an application identity, a username, and a nonce.

13. The computer program product of claim 9, further comprising a fourth executable portion for generating the password in the GBA unit.

14. The computer program product of claim 9, further comprising a fourth executable portion for storing the password in the PPM.

15. The computer program product of claim 14, wherein the fourth executable portion includes instructions for storing a hyper text transfer protocol (HTTP) password.

16. The computer program product of claim 15, wherein the first executable portion includes instructions for receiving a request for a hyper text transfer protocol (HTTP) response.

17. An apparatus comprising:
   a processor; and
   a memory including computer program code, the memory and the computer program code configured to, with the processor, cause the apparatus to at least:
   receive a request for an authentication response from a response generation module (RGM) in communication with a password provisioning module (PPM) and a client application sending the request, the PPM, the RGM, and a generic bootstrapping architecture (GBA) unit being disposed at a user identity module (UIM), and the client application being outside of the UIM on a user terminal in communication with the UIM;
   cause a password to be sent from the PPM to the RGM in response to the request, wherein the password is generated by the GBA unit and stored in the PPM;
   generate the authentication response at the RGM, via a processor of the UIM, from the password and a bootstrapping transaction ID in response to the request and the password; and
   cause the authentication response to be sent from the RGM, off of the UIM, to the client application.

18. An apparatus of claim 17, wherein the memory including the computer program code is further configured to, with the processor, cause the apparatus to cause the password, generated by the GBA unit to be stored in the PPM and then to be sent from the PPM to the RGM such that the password never leaves the UIM.

19. An apparatus of claim 17, wherein the memory including the computer program code is further configured to, with the processor, cause the apparatus to generate a hyper text transfer protocol (HTTP) response including a checksum of a username, the password, a nonce value, an HTTP method and a requested universal resource identifier (URI).

20. An apparatus of claim 17, wherein the memory including the computer program code is further configured to, with the processor, cause the apparatus to receive the request which includes an application identity, a username, and a nonce.

21. An apparatus of claim 17, wherein the memory including the computer program code is further configured to, with the processor, cause the apparatus to generate the password in the GBA unit.

22. An apparatus of claim 17 wherein the memory including the computer program code is further configured to, with the processor, cause the apparatus to store the password in the PPM.

23. An apparatus of claim 22, wherein the memory including the computer program code is further configured to, with the processor, cause the apparatus to store a hyper text transfer protocol (HTTP) password.

24. An apparatus of claim 23, wherein the memory including the computer program code is further configured to, with the processor, cause the apparatus to receive a request for a hyper text transfer protocol (HTTP) response.

* * * * *

UNITED STATES PATENT AND TRADEMARK OFFICE
CERTIFICATE OF CORRECTION

PATENT NO.         : 8,316,426 B2
APPLICATION NO.    : 11/551449
DATED              : November 20, 2012
INVENTOR(S)        : Guo Page 1 of 1

It is certified that error appears in the above-identified patent and that said Letters Patent is hereby corrected as shown below:

In the Specifications:

Column 5,
Line 2, "UIN" should read --UIM--;
Line 3, "SIN" should read --SIM--.

Column 7,
Line 16, "usemame" should read --username--.

Signed and Sealed this
Fourth Day of June, 2013

Teresa Stanek Rea
*Acting Director of the United States Patent and Trademark Office*